(12) United States Patent
Kishi et al.

(10) Patent No.: US 7,568,499 B2
(45) Date of Patent: Aug. 4, 2009

(54) FUEL CHECK VALVE

(75) Inventors: Morihiko Kishi, Kanagawa (JP);
Shinichi Matsuo, Kanagawa (JP)

(73) Assignee: Piolax Inc., Yokohama-shi, Kanagawa-ken (JP)

( * ) Notice: Subject to any disclaimer, the term of this patent is extended or adjusted under 35 U.S.C. 154(b) by 340 days.

(21) Appl. No.: 11/453,884

(22) Filed: Jun. 16, 2006

(65) Prior Publication Data
US 2007/0012365 A1    Jan. 18, 2007

(30) Foreign Application Priority Data
Jul. 13, 2005  (JP) .......................... P2005-204585

(51) Int. Cl.
*F16K 15/00* (2006.01)
(52) U.S. Cl. .................... 137/527.6; 137/527
(58) Field of Classification Search ................ 137/385, 137/512.1, 527, 527.4, 527.6; 251/238; 123/184.55; 128/205.24; 239/526; 623/2.21
See application file for complete search history.

(56) References Cited
U.S. PATENT DOCUMENTS
4,614,203 A * 9/1986 Russo ....................... 137/385

2004/0231728 A1 * 11/2004 Martin et al. ............... 137/527

FOREIGN PATENT DOCUMENTS
| JP | 11-28938 | 2/1999 |
| JP | 2001-263514 | 9/2001 |

* cited by examiner

*Primary Examiner*—John Rivell
*Assistant Examiner*—Macade Brown
(74) *Attorney, Agent, or Firm*—McGinn IP Law Group PLLC

(57) ABSTRACT

A fuel check valve that includes: a pipe having a fuel outflow port; a valve element attached in an openable and closable manner to the fuel outflow port of the pipe, the valve element being normally urged by a spring in a closing direction; a support shaft disposed on one of the pipe and the valve element while a basal end portion thereof is fixed and a tip end portion thereof is made free, the support shaft functioning as a swing fulcrum for the valve element; and a bearing portion disposed on another one of the pipe and the valve element to swingably support the support shaft, the bearing portion including: a receiving hole into which the tip end portion of the support shaft is inserted; and an engaging groove with which a basal portion side of the support shaft is engaged.

19 Claims, 8 Drawing Sheets

FUEL CHECK VALVE

BACKGROUND OF THE INVENTION

1. Field of the Invention

The present invention relates to a fuel check valve that is to be attached to an opening of, for example, a fuel supply pipe of a fuel tank and opens the opening during a refueling process to allow a fuel to be supplied to the fuel tank. The fuel check valve closes the opening during a period other than the refueling process to prevent the fuel from flowing back.

2. Description of the Related Art

A fuel supply pipe for supplying a fuel is attached to a fuel tank of an automobile. A fuel check valve (hereinafter, also referred to as a check valve), which prevents the fuel from flowing back is attached in an openable and closable manner to a downstream opening of the fuel supply pipe.

As a conventional check valve of this kind, JP-A-11-28938 and JP-A-2001-263514 disclose a check valve that is configured by a pipe and a valve element. The valve element is attached to an outflow port of the pipe in an openable and closable manner. The valve element is normally urged by a spring in a closing direction.

In the check valve disclosed in JP-A-11-28938, a clip-like support member, in which a pair of substantially C-like bearing portions are disposed, is mounted on the peripheral edge of the outflow port of the pipe. A support shaft, in which a tip end side is cantilevered via a supporting piece, is disposed on the valve element. The support shaft is inserted into the bearing portions of the support member, whereby the valve element is swingably attached to the pipe.

In the check valve disclosed in JP-A-2001-263514, a frame-like hinge bracket having a pair of wall-like portions, in each of which a shaft support hole is formed, is mounted to the vicinity of the outflow port of the pipe. A hinge portion hangs from the peripheral edge of a valve element. Support shafts protrude on the same axis from the both sides of the hinge portion, respectively. The support shafts are inserted into the respective shaft support holes of the hinge bracket, whereby the valve element is swingably attached to the pipe.

SUMMARY OF THE INVENTION

In the check valve disclosed in JP-A-11-28938, the support shaft is cantilevered by the supporting piece. When the support shaft is pushed into the bearing portions, a large bending moment acts on a coupling portion between the support shaft and the supporting piece. Thus, there is a possibility that the support shaft may be broken. The bearing portions have a substantially C-like shape and are partly opened. Consequently, there is a possibility that the support shaft may be detached from the opening portions during transportation or the like.

In the check valve disclosed in JP-A-2001-263514, the valve element is attached as shown in FIG. 8. In this figure, the hinge portion of the valve element is not shown, and only the support shafts 75 are shown. In this case, the support shafts 75 are pressed against the pair of wall-like portions 100, 100 from the upper side thereof, and end portions of the support shafts 75 are inserted into the shaft support holes 101, 101, respectively while the wall-like portions 100, 100 are outward bent (see the phantom lines in FIG. 8). Since the wall-like portions 100 must be bent, there is a problem in that the inserting work is troublesome. When, in order to facilitate the inserting work, the clearance between the wall-like portions 100, 100 is increased, or the support shafts 75 are shortened, there arises another problem of rattling occurring when the valve element is attached.

When inserting the support shafts 75, a bending stress is applied to the end portions of the support shafts 75, and they are bent as indicated by the phantom lines in FIG. 8. Therefore, the possibility that the support shafts 75 may be broken cannot be eliminated.

The attaching work is conducted after the spring is put on one of the support shafts protruding from the both sides of the hinge portion. Therefore, the workability is low. Furthermore, a synthetic resin having a high fuel resistance, such as polyoxymethylene (POM) is poor in flexibility, and hardly bent. Consequently, such a resin cannot be used.

Therefore, it is an object of the invention to provide a fuel check valve, in which a support shaft can be attached to a bearing portion without being broken and the workability of the attaching work can be improved.

According to a first aspect of the invention, there is provided a fuel check valve that is attachable to a fuel tank, including: a pipe having a tip end portion formed as a fuel outflow port, and a basal end portion that communicates with a fuel supply pipe; a valve element attached in an openable and closable manner to the fuel outflow port of the pipe, the valve element being normally urged by a spring in a closing direction; a support shaft disposed on one of the pipe and the valve element while a basal end portion thereof is fixed and a tip end portion thereof is made free, the support shaft functioning as a swing fulcrum for the valve element; and a bearing portion disposed on another one of the pipe and the valve element to swingably support the support shaft, the bearing portion including: a receiving hole into which the tip end portion of the support shaft is inserted; and an engaging groove with which a basal portion side of the support shaft is engaged.

According to the above configuration, in a state where the tip end portion of the support shaft is inserted into the receiving hole, the basal portion side of the support shaft is inserted into the engaging groove, whereby the support shaft is swingably attached to the bearing portion. Even when the support shaft is cantilevered, therefore, the valve element can be attached to the pipe without breaking the support shaft.

Even when the bearing portion is made of a fuel-resistant synthetic resin having little flexibility, for example, the support shaft can be easily attached to the bearing portion because it is not necessary to bend the bearing portion. Furthermore, the clearance required for attachment between the bearing portion and the support shaft can be made small, and hence rattling of the valve element can be reduced.

Moreover, the basal end portion of the support shaft is attached to the engaging groove by means of engagement, but the tip end portion is attached in the state where the portion is inserted into the receiving hole. As compared with a configuration in which a support shaft is simply engaged with an engaging groove, therefore, the support shaft is hardly detached from the bearing portion, and the strength can be improved.

According to a second aspect of the invention, the support shaft includes an increased-diameter portion adjacent to the tip end portion, a diameter of the increased-diameter portion is larger than an inner diameter of the receiving hole, and a coil portion of the spring is attached to the increased-diameter portion.

According to the above configuration, the diameter of the increased-diameter portion is increased so as to be larger than the inner diameter of the receiving hole. In the process of inserting the tip end portion of the support shaft into the receiving hole, therefore, the increased-diameter portion butts against the peripheral edge of the receiving hole to perform axial positioning, and the workability of insertion can be improved. Since the coil portion of the spring is attached to the increased-diameter portion, the clearance between the inner periphery of the coil portion and the support shaft is reduced, so that rattling of the coil portion can be suppressed and the spring can be stably held.

According to a third aspect of the invention, the basal portion side of the support shaft is supported by a pair of supporting pieces, and a portion of the bearing portion enters between the supporting pieces, the portion having the engaging groove.

According to the above configuration, the basal portion side of the support shaft is supported by the pair of supporting pieces. Therefore, the strength is enhanced, and, in the process of inserting the basal portion side of the support shaft into the engaging groove of the bearing portion, it is possible to effectively prevent the support shaft from being broken. Since the portion having the engaging groove of the bearing portion enters between the pair of supporting pieces, axial positioning of the support shaft can be performed, and rattling in the axial direction can be prevented from occurring.

According to a fourth aspect of the invention, a cutaway portion that is cut away toward a tip end in an axial direction is formed in a part in a circumferential direction of the tip end portion of the support shaft.

According to the above configuration, the cutaway portion is formed in a part in the circumferential direction of the tip end portion of the support shaft. When the tip end portion of the support shaft is obliquely inserted into the receiving hole, therefore, the cutaway portion first butts against the inner periphery of the receiving hole, whereby the tip end portion can be inserted more deeply into the receiving hole. Consequently, the operation of pushing the basal portion side of the support shaft into the engaging groove can be facilitated, and the workability of insertion can be improved.

According to a fifth aspect of the invention, in the increased-diameter portion of the support shaft, a further cutaway portion is disposed at a position that is opposed in a circumferential direction to the cutaway portion of the tip end portion.

According to the above configuration, in the increased-diameter portion of the support shaft, the further cutaway portion is disposed at a position which is opposed in a circumferential direction to the cutaway portion of the tip end portion. When the tip end portion of the support shaft is obliquely inserted into the receiving hole, therefore, the cutaway portion of the tip end portion butts against the inner periphery of the receiving hole, and the cutaway portion of the increased-diameter portion butts against the peripheral edge of the receiving hole, whereby the support shaft can be inserted more deeply into the receiving hole, and the workability of insertion can be improved. Furthermore, the gap between the increased-diameter portion of the support shaft and the receiving hole can be reduced as far as possible, and rattling of the support shaft in the axial direction can be prevented from occurring.

According to a sixth aspect of the invention, a stopper wall that restricts an opening angle of the valve element is formed on one of the pipe and the valve element.

According to the above configuration, the stopper wall which restricts the opening angle of the valve element is formed on one of the pipe and the valve element. Therefore, the valve element is prevented from being over-opened, and it is possible to suppress an application of an excessive load on the spring.

BRIEF DESCRIPTION OF THE DRAWINGS

FIG. 3A is a diagram of a process of inserting the valve element into a bearing portion, and FIG. 3B is a diagram showing a state where the valve element is attached to the bearing portion;

FIG. 6A is a diagram of a case where a cutaway portion is disposed in a tip end portion of a support shaft, and FIG. 6B is a diagram of a case where the cutaway portion is not disposed in the tip end portion of the support shaft;

DETAILED DESCRIPTION OF THE PREFERRED EMBODIMENT

Hereinafter, an fuel check valve according to an embodiment of the invention will be described with reference to FIGS. 1 to 7.

Figure 7:
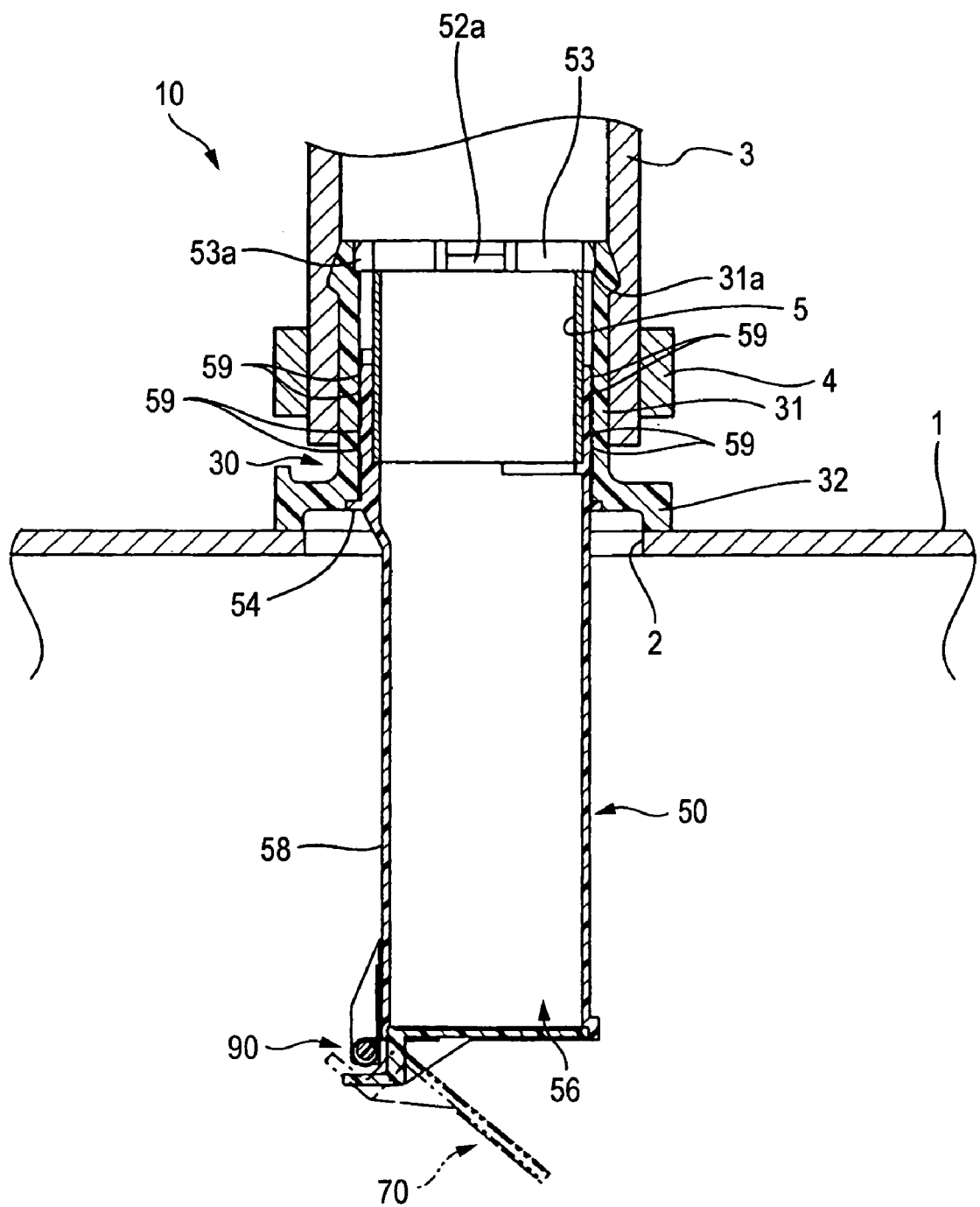
FIG. 7 is a diagram showing a state where the fuel check valve is attached to a fuel tank.
Figure 8:
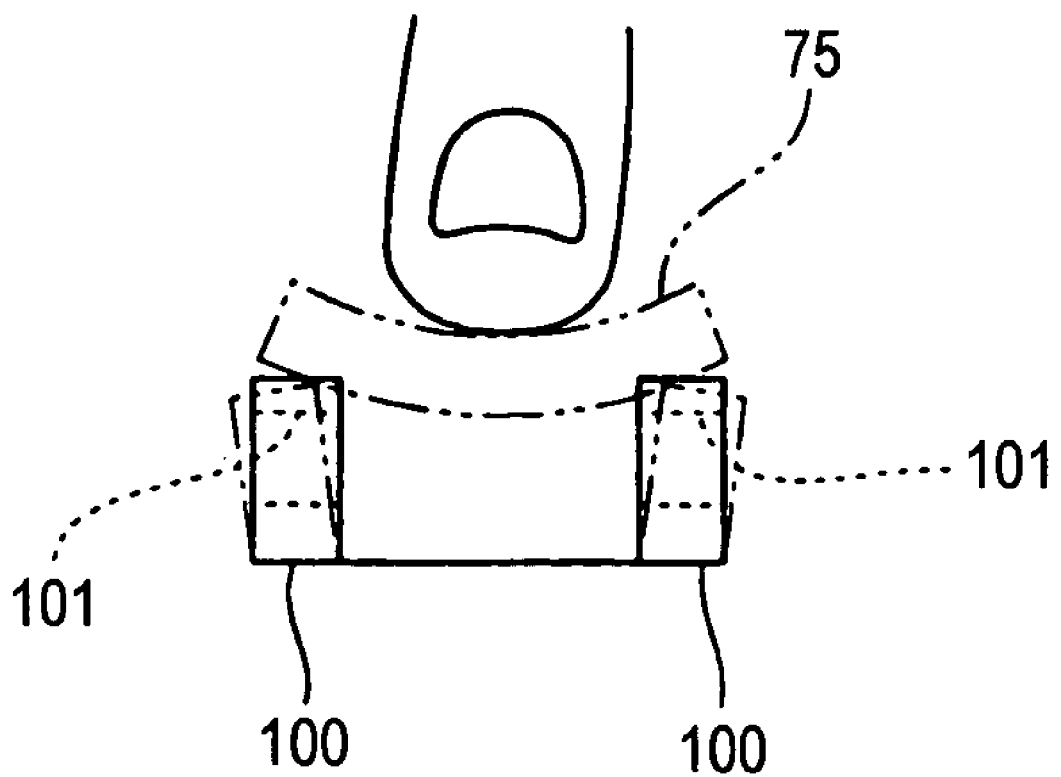
FIG. 8 is a diagram of a case where a support shaft of a valve element of a conventional fuel check valve is to be inserted into a shaft support hole.

As shown in FIG. 7, a fuel check valve 10 (hereinafter, referred to as the check valve 10) is attached to a resin-made fuel tank 1.

Figure 1:
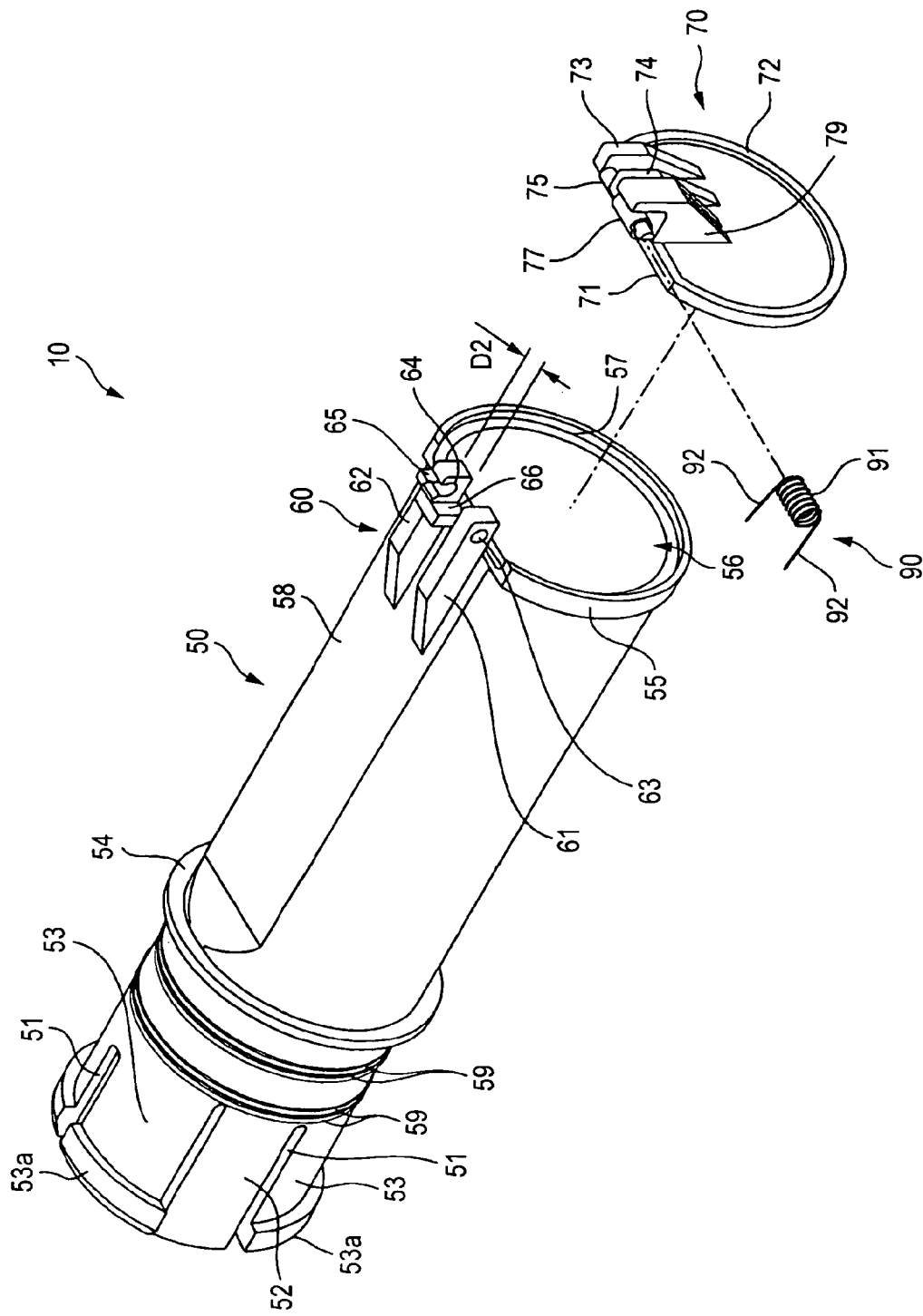
FIG. 1 is an exploded perspective view showing an embodiment of the fuel check valve of the invention.

As shown in FIGS. 1 and 7, the check valve 10 is configured mainly by: a housing 30 that is to be fixed to a wall portion of the fuel tank 1; a pipe 50 that is attached to the housing 30; a valve element 70 that is attached to a bearing portion 60 of the pipe 50; and a spring 90 that elastically urges the valve element 70 in a closing direction toward an outflow port 56 of the pipe 50.

As shown in FIG. 7, the housing 30 that is to be attached to the fuel tank 1 has: a tubular connecting pipe portion 31 to which a fuel supply pipe 3 is to be connected; and a flange 32 that outward extends from the peripheral edge of the lower end of the connecting pipe portion 31 and is to be welded to the peripheral edge of an attachment hole 2 of the fuel tank 1. The housing 30 is formed by a material, which is weldable to the resin-made fuel tank 1, for example, an olefin resin such as polyethylene.

As shown in FIG. 1, in the pipe 50, which is to be attached to the housing 30, plural slits 51 elongating in the axial direction are formed in an upstream (the side where the housing 30 is attached) end portion of the pipe, and collar holding pieces 52 and elastic engaging pieces 53 are formed via the slits 51. Engaging hooks 52a are formed on the inner peripheries of the tip ends of the collar holding pieces 52, so that a reinforcing metal collar 5 can be held as shown in FIG. 7. Engaging hooks 53a protrude from the outsides of the tip ends of the elastic engaging pieces 53. The engaging hooks 53a are engaged with a step 31a disposed on the inner periphery of the connecting pipe portion 31. An annular flange 54, which protrudes from the outer periphery of a middle portion of the pipe 50 that is slightly shifted toward the tip end butts, against the lower end face of the connecting pipe portion 31, whereby the pipe 50 is lockingly attached to the housing 30 (see FIG.

7). In the embodiment, the housing 30 and the pipe 50 are separately formed, and the pipe is coupled to the housing 30. Alternatively, the housing 30 and the pipe 50 may be integrally formed.

On the outer periphery of the pipe 50, a pair of annular ribs 59, 59 are disposed with a predetermined gap therebetween in close proximity to the lower ends of the slits 51. With being separated by a predetermined distance from the pair of annular ribs 59, 59, another pair of annular ribs 59, 59 are disposed on the outer periphery of the pipe 50. These ribs 59 will function as portions which, when the fuel supply pipe 3 is fastened and fixed, are pressingly contacted with the inner circumferential face of the housing 30 to enhance the sealing property.

The downstream end of the pipe 50 is configured as the outflow port 56, and a flange 55 is formed on the outer periphery thereof. The inner periphery of the flange 55 is a valve seat 57 against which the valve element 70 (described later) butts to close the outflow port 56.

As shown in FIG. 1, a flat portion 58, which extends with a predetermined width in the axial direction, is formed on the outer periphery of the pipe 50. The bearing portion 60, which swingably supports a support shaft 75 of the valve element 70 that will be described later, is disposed on the flat portion 58 and in the vicinity of the outflow port 56.

The bearing portion 60 has a pair of support arms 61, 62 that upstand from the flat portion 58 in the axial direction and in parallel to each other. The tip ends of the support arms 61, 62 axially elongate toward the downstream side of the outflow port 56 of the pipe 50.

A receiving hole 63, into which a tip end portion of the support shaft 75 of the valve element 70 (described later) is inserted, is formed in the tip end of the one support arm 61.

An engaging groove 64, which has a substantially C-like shape as seen from a lateral side, is formed in the tip end of the other support arm 62. In the embodiment, the engaging groove 64 opens on the outer side in a radial direction of the pipe 50, so that a basal portion side of the support shaft 75 of the valve element 70 can be inserted in this direction.

Stopper walls 65, 66 for restricting the opening angle of the valve element 70 are disposed on the both respective sides of the support arm 62 in the axial direction. In the embodiment, the stopper walls 65, 66 upstand perpendicular to the flat portion 58 from an axial edge of the flat portion 58.

The support shaft 75 of the valve element 70 is attached to the bearing portion 60, whereby the valve element 70 is swingably attached to the pipe 50. The valve element 70 has a substantially disk-like shape as a whole. A part of the shape is linearly cut away to be formed as a cutaway edge portion 71, so that the valve element is formed into a shape matching the inner peripheral shape of the flange 55 of the pipe 50.

A rib 72 that protrude respectively to the front and rear sides of the valve element 70 are formed on the peripheral edge of the valve element. The rib 72 reinforce the valve element 70. The rib 72 protruding to the rear face side butts against the above-mentioned valve seat 57 of the pipe 50 to perform a function of closing the outflow port 56.

Figure 2:
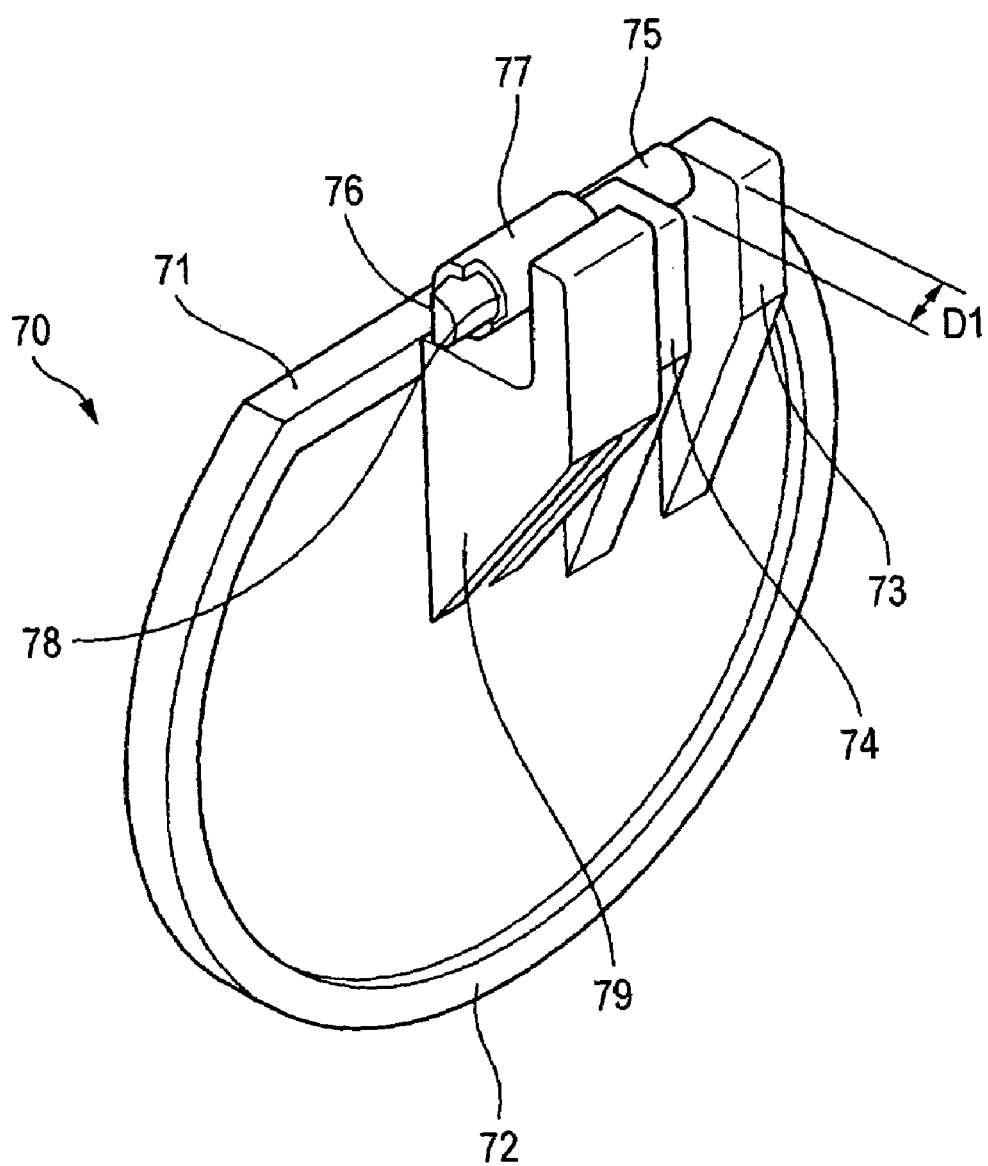
FIG. 2 is a perspective view showing a valve element of the fuel check valve.

Referring also to FIG. 2, a pair of supporting pieces 73, 74 extend outward from the front face of the valve element 70 perpendicular to the cutaway edge portion 71, and in parallel to each other with being separated by a predetermined distance D1 from each other. The distance D1 has a value that approximately matched the width D2 of the tip end portion of the support arm 62 in which the engaging groove 64 is formed.

The support shaft 75 is disposed perpendicular to the supporting pieces 73, 74 so as to couple the supporting pieces 73, 74 with each other. The support shaft 75 protrudes from the outer side of the one supporting piece 74 along the cutaway edge portion 71. The protrusion portion is configured by a tip end portion that is inserted into the receiving hole 63, and an increased-diameter portion 77 that is adjacent to the tip end portion.

A cutaway portion 76 that is formed by cutting away a circumferential part of the tip end in the axial direction is formed in the tip end portion of the support shaft 75. In the embodiment, the cutaway portion 76 is configured as a tapered face that is formed by obliquely cutting the tip end portion of the support shaft 75. The cutaway portion 76 is placed so that the cutaway portion becomes a portion that first butts against the inner periphery of the receiving hole 63 when, in a state where the valve element 70 is opened substantially perpendicular to the outflow port 56, the basal portion side of the support shaft 75 is positioned above the engaging groove 64, and the tip end portion of the support shaft 75 is obliquely inserted into the receiving hole 63.

In an end face of the increased-diameter portion 77 that is adjacent to the tip end portion of the support shaft 75, another cutaway portion 78 is formed at a position that is circumferentially opposed to the cutaway portion 76 in the tip end portion. In the embodiment, the cutaway portion 78 has a shape that is formed by arcuately removing the end face of the increased-diameter portion 77 at a predetermined angle in a circumferential direction. The outer diameter of the increased-diameter portion 77 is larger than the inner diameter of the receiving hole 63. The increased-diameter portion 77 is a portion to which a coil portion 91 (described later) of the spring 90 is attached.

A substantially L-like cover member 79 protrudes from the front side of the valve element 70 so as to cover the increased-diameter portion 77 of the support shaft 75 on the downstream side of the outflow port 56 in the axial direction, in a state where the valve element 70 closes the outflow port 56 of the pipe 50.

As shown in Fig. 1, the spring 90 is formed by winding a metal wire, and configured by: the coil portion 91 that is attached to the increased-diameter portion 77 of the support shaft 75 of the valve element 70; and leg portions 92, 92 that elongate from the both ends of the coil portion 91, respectively. After the coil portion 91 is attached to the increased-diameter portion 77 of the support shaft 75, the support shaft 75 is supported by the bearing portion 60, and the leg portions 92 are engaged with the pipe 50 and the valve element 70, respectively, whereby the valve element 70 is caused to elastically butt against the outflow port 56, and normally urged in a direction of closing the outflow port 56.

Alternatively, the spring 90 may have a shape that has two coil portions, which are attached respectively to the both ends of the support shaft and are coupled together by a C-like coupling member. In the case of the alternative spring, the two coil portions are attached respectively to the both ends of the support shaft, two leg portions elongating from other ends of the two coil portions are engaged with the pipe, and the C-like coupling member is engaged with the valve element, thereby urging the valve element in the closing direction.

Next, the function and effects of the check valve 10 of the embodiment will be described.

As shown in FIGS. 1 and 7, first, the elastic engaging pieces 53 of the pipe 50 are inserted into the housing 30 while being bent, to cause the engaging hooks 53a of the elastic engaging pieces 53 to engage with the step 31a of the housing 30, and the annular flange 54 of the pipe 50 butts against the lower end face of the connecting pipe portion 31 of the housing 30, thereby attaching the pipe 50 into the housing 30. Then, the metal collar 5 is inserted from the upper side of the housing 30, and held by the engaging hooks 52a formed on the inner peripheries of the collar holding pieces 52.

Next, the tip end portion of the support shaft 75 is inserted into the coil portion 91 of the spring 90, so that the coil portion 91 is attached to the increased-diameter portion 77.

Figure 3A:
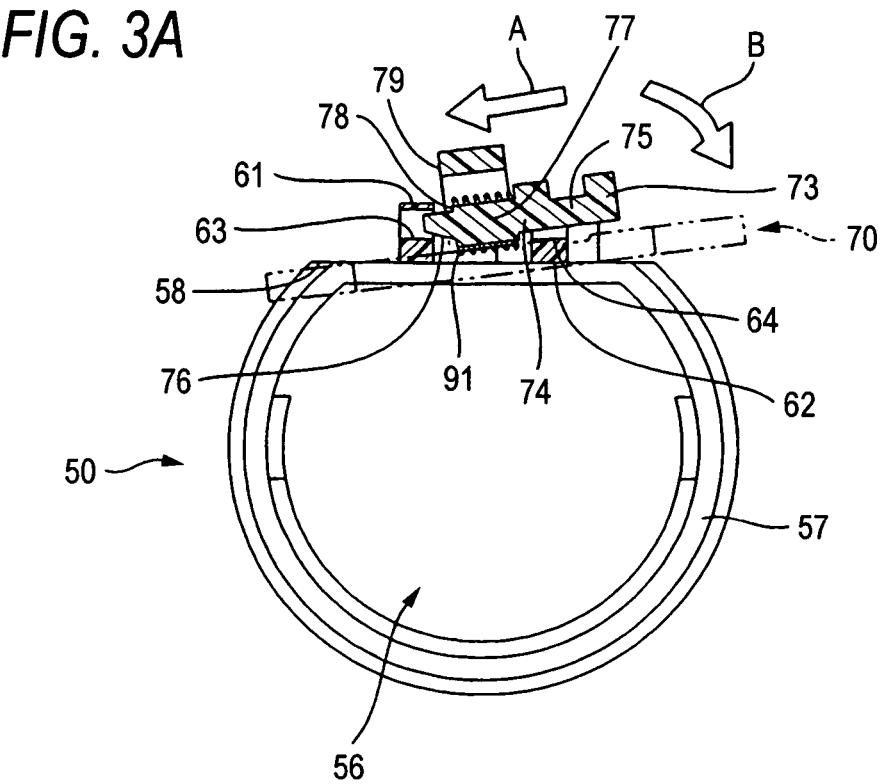
FIGS. 3A and 3B show steps of assembling the fuel check valve.

In this state, as shown in FIG. 3A, the valve element 70 is opened substantially perpendicular to the outflow port 56. In the opened state, the basal portion side of the support shaft 75 is positioned above the engaging groove 64, and the tip end portion of the support shaft 75 is obliquely inserted into the receiving hole 63 as indicated by the arrow A.

Figure 6A:
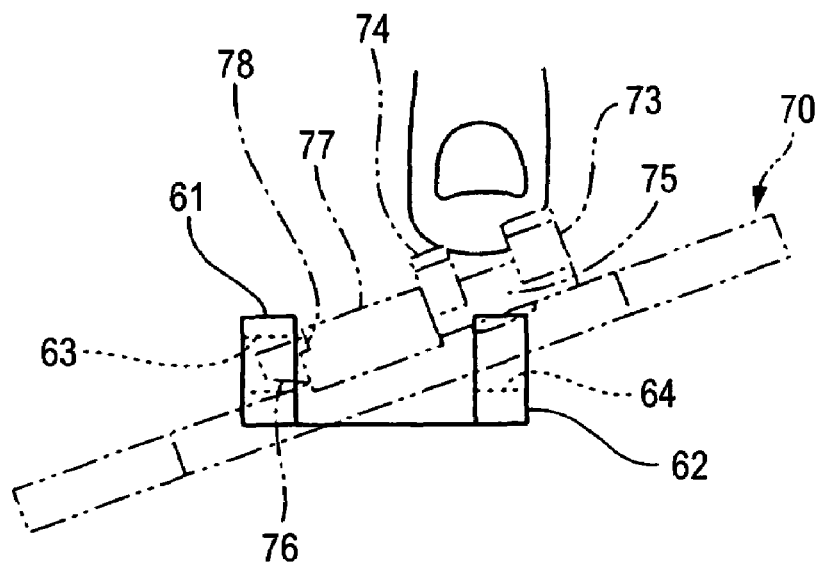
FIGS. 6A and 6B show a work of assembling the fuel check valve.

At this time, as shown in FIG. 6A, the tapered cutaway portion 76 disposed in the tip end portion of the support shaft 75 first butts against the lower inner periphery of the receiving hole 63, and the cutaway portion 78 of the increased-diameter portion 77 butts against the upper peripheral edge of the receiving hole 63. Even when the tip end portion of the support shaft 75 is obliquely inserted, therefore, the tip end portion can be deeply inserted into the receiving hole 63 as far as possible. Furthermore, the end face of the increased-diameter portion 77 butts against the peripheral edge of the receiving hole 63, and hence the axial positioning of the support shaft 75 can be performed in the process of pushing the support shaft 75 into the engaging groove 64.

Figure 6B:
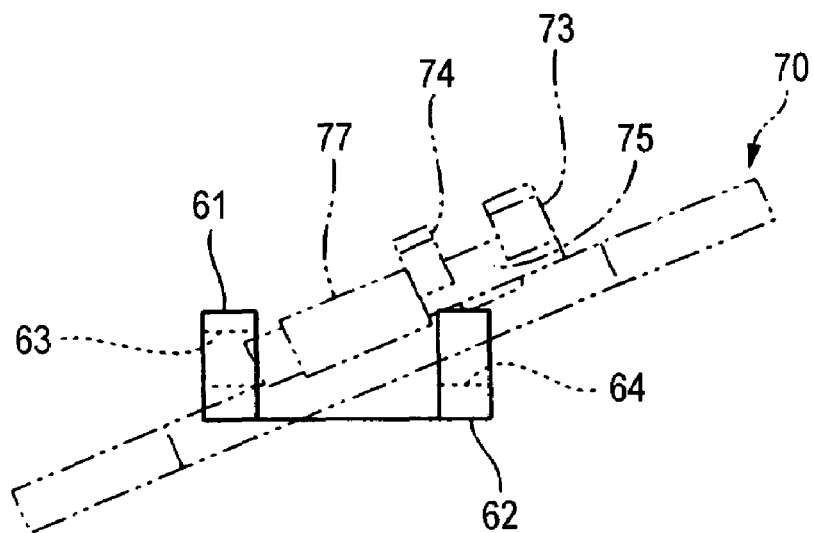

As shown in FIG. 6B, in the case where the cutaway portion 76 of the tip end portion and the cutaway portion 78 of the increased-diameter portion 77 are not disposed, when the tip end portion of the support shaft 75 is to be obliquely inserted into the receiving hole 63, the tip end portion is caught by the inner periphery of the receiving hole 63 and cannot be deeply inserted into the receiving hole 63. Therefore, the distance between the support arms 61, 62 must be further increased, with a result that there arises a disadvantage that rattling in the axial direction is further increased in the state where the support shaft 75 is attached.

When the tip end portion of the support shaft 75 is inserted into the receiving hole 63, the basal portion side of the support shaft 75 is pushed from the upper side of the engaging groove 64 of the support arm 62 as indicated by the arrow B in FIG. 3A, and inserted into the engaging groove 64 to be held thereby.

At this time, as shown in FIG. 6A, the basal portion side of the support shaft 75 is supported by the supporting pieces 73, 74, and the portion between the supporting pieces is pushed into the engaging groove 64. Therefore, the support shaft 75 can be easily pushed into the engaging groove 64 without being broken.

Figure 3B:
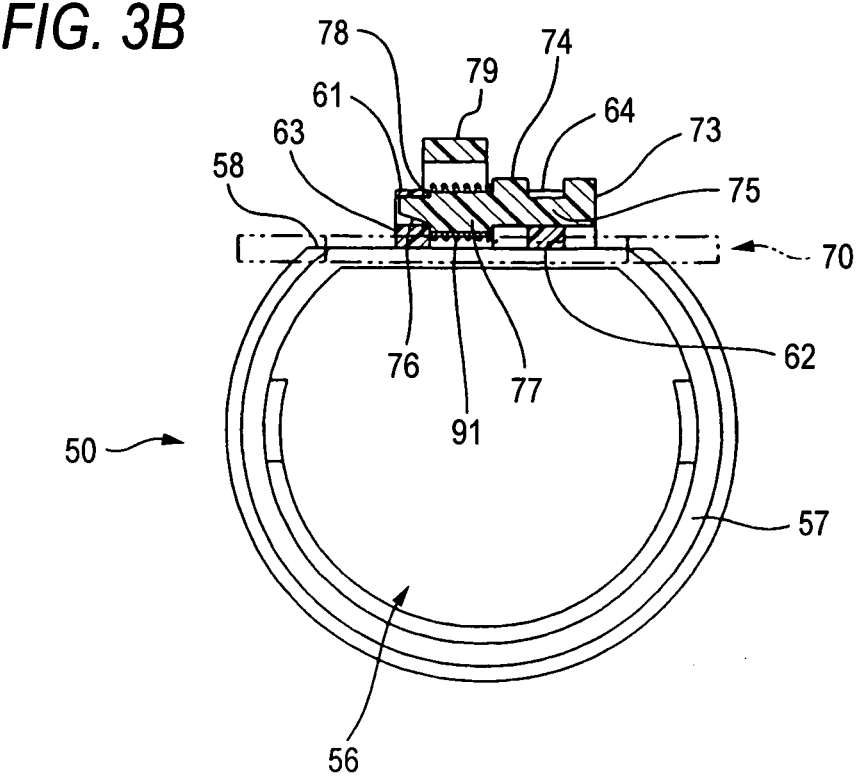
Figure 4:
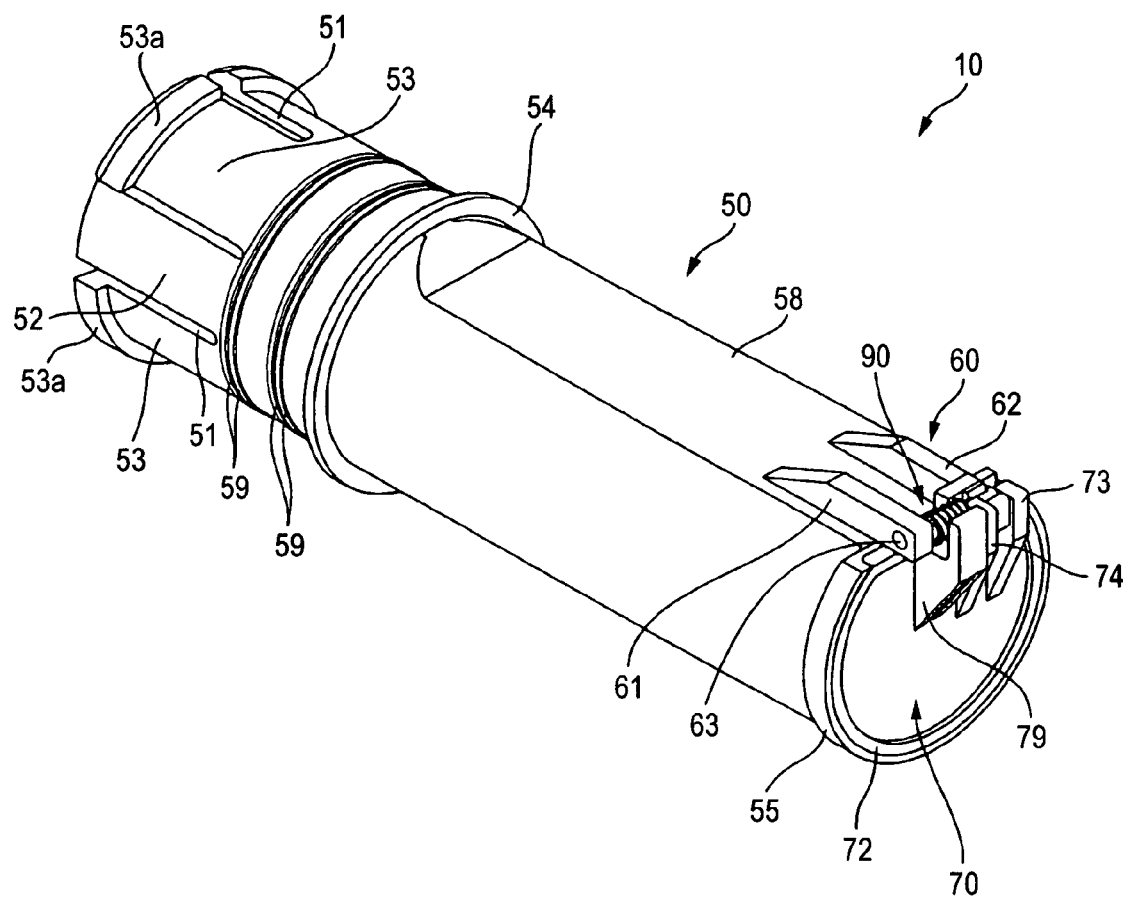
FIG. 4 is a perspective view showing a state where the valve element of the fuel check valve is attached.
Figure 5:
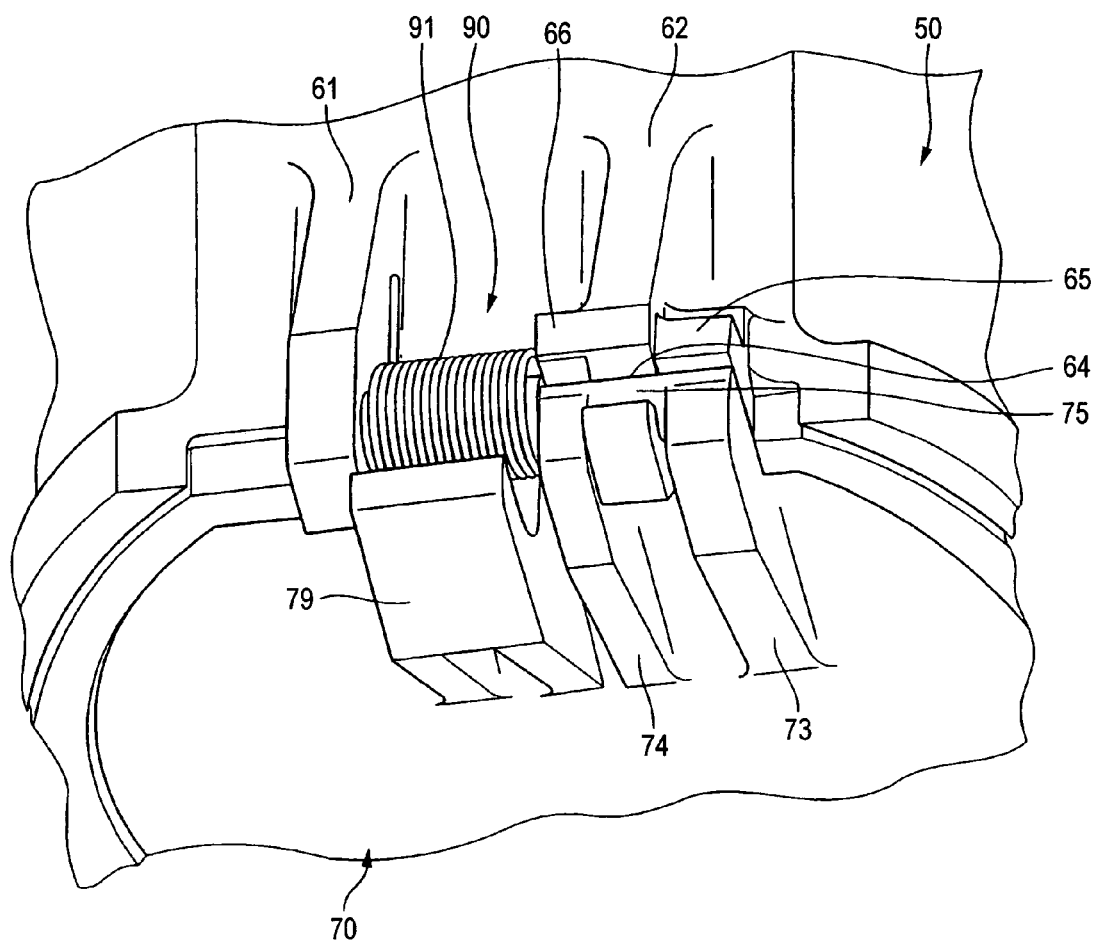
FIG. 5 is an enlarged perspective view of main portions of the fuel check valve.

As shown in FIGS. 3B, 4, and 5, the valve element 70 is swingably attached to the bearing portion 60 via the support shaft 75.

As shown in FIG. 7, the check valve 10 that is assembled as described above is inserted into the attachment hole 2 of the resin-made fuel tank 1, and then attached to the fuel tank 1 by welding the flange 32 of the housing 30 to the peripheral edge of the attachment hole 2.

In the process in which the peripheral edge of the attachment hole 2 of the fuel tank 1 is heated, the check valve 10 is inserted, and the flange 32 is thermally welded to the attachment hole 2 of the fuel tank 1, the softened resin in the peripheral edge of the attachment hole 2 can be prevented from adhering to the coil portion 91 of the spring 90 on the way of insertion of the check valve 10, by the cover member 79.

The fuel supply pipe 3 is inserted onto the connecting pipe portion 31 of the housing 30 and fastened and fixed thereto by a hose band 4. The four annular ribs 59 are disposed on the pipe 50. With advancement of the fastening and fixation of the fuel supply pipe 3 by the hose band 4, the outer periphery of the housing 30 is pressed. Then, the ribs 59 are locally in pressure contact with the inner periphery of the connecting pipe portion 31 of the housing 30. Therefore, the sealing property between the housing 30 and the pipe 50 can be effectively enhanced.

When a fuel supplied from a fuel supply port (not shown) flows into the check valve 10 through the fuel supply pipe 3, the valve element 70 is pressed by the fluid pressure caused by the fuel, and, as indicated by the phantom line in FIG. 7, the valve element 70 is opened to supply the fuel into the fuel tank 1. By contrast, when a fuel is not supplied, the valve element 70 is elastically urged in the closing direction by the elastic urging force of the spring 90, to close the outflow port 56. As a result, the fuel can be prevented from flowing back, and also from blowing back from the fuel supply port due to the internal pressure of the fuel tank 1 or the like.

As shown in FIG. 5, when the valve element 70 is swung by about 90 deg. to be opened, the rear end faces of the pair of supporting pieces 73, 74 supporting the basal portion side of the support shaft 75 butt against the stopper walls 65, 66, thereby restricting further swing. As a result, it is possible to suppress an application of an excessive load on the spring 90. When the shapes of the rear end faces of supporting pieces 73, 74 or the stopper walls 65, 66 are changed, the maximum opening angle of the valve element 70 can be set to a desired value.

Since the support arm 62 is situated between the pair of supporting pieces 73, 74, the axial positioning of the support shaft 75 can be performed, and the support shaft can be prevented from rattling.

Since the coil portion 91 of the spring 90 is attached on the outer periphery of the increased-diameter portion 77 of the support shaft 75, the gap between the inner periphery of the coil portion 91 and the increased-diameter portion 77 is small, and the spring 90 can be held without causing rattling.

In the embodiment, the bearing portion 60 is disposed on the pipe 50, and the support shaft 75 is disposed on the valve element 70. Alternatively, the support shaft 75 may be disposed on the pipe 50, and the bearing portion 60 may be disposed on the valve element 70.

What is claimed is:

1. A fuel check valve that is attachable to a fuel tank, comprising:

a pipe having a tip end portion formed as a fuel outflow port, and a basal end portion that communicates with a fuel supply pipe;

a valve element attached in an openable and closable manner to the fuel outflow port of the pipe, the valve element being normally urged by a spring in a closing direction;

a support shaft disposed on one of the pipe and the valve element, a basal end portion of the support shaft being fixed to the one of the pipe and the valve element and a tip end portion of the support shaft being free relative to the one of the pipe and the valve element, the support shaft functioning as a swing fulcrum for the valve element; and a bearing portion disposed on another one of the pipe and the valve element, the bearing portion swingably supporting the support shaft, the bearing portion comprising:

a receiving hole into which the tip end portion of the support shaft is inserted; and an engaging groove with which the basal end portion side of the support shaft is engaged, wherein the support shaft includes an increased-diameter portion adjacent the tip end portion, a diameter of the increased-diameter portion is larger than an inner diameter of the receiving hole, and a coil portion of the spring is attached to the increased-diameter portion.

2. The fuel check valve according to claim 1, wherein a stopper wall that restricts an opening angle of the valve element is formed on one of the pipe and the valve element.

3. The fuel check valve according to claim 1, wherein the spring is disposed between the basal end portion and the tip end portion of the support shaft.

4. The fuel check valve according to claim 1, wherein the support shaft and the bearing portion are configured such that the tip end portion of the support shaft is placed in the receiving hole prior to swinging the basal portion side of the support shaft into the groove.

5. The fuel check valve according to claim 1, further comprising a supporting piece disposed between the receiving hole and the engaging groove.

6. The fuel check valve according to claim 1, wherein the engaging groove has a substantially C-like shape.

7. The fuel check valve according to claim 1, wherein an open side of the engaging groove faces radially away from the pipe.

8. The fuel check valve according to claim 1, further comprising a first supporting piece disposed on a first side of the engaging groove in a longitudinal direction of the support shaft and a second supporting piece disposed on a second side of the engaging groove in the longitudinal direction of the support shaft different from the first side.

9. The fuel check valve according to claim 1, wherein the fuel check valve includes no more than one support shaft.

10. The fuel check valve according to claim 1, wherein the bearing portion includes at least two support arms, and
wherein one of the at least two support arms includes the receiving hole and another of the at least two support arms includes the engaging groove.

11. The fuel check valve according to claim 1, wherein the bearing portion is asymmetric.

12. The fuel check valve according to claim 1, wherein a length of the support shaft is greater than a distance between the receiving hole and the engaging groove.

13. The fuel check valve according to claim 1, further comprising a gap between the receiving hole and the engaging groove.

14. The fuel check valve according to claim 1, wherein the receiving hole is circular.

15. A fuel check valve that is attachable to a fuel tank, comprising:
a pipe having a tip end portion formed as a fuel outflow port, and a basal end portion that communicates with a fuel supply pipe;
a valve element attached in an openable and closable manner to the fuel outflow port of the pipe, the valve element being normally urged by a spring in a closing direction;
a support shaft disposed on one of the pipe and the valve element, a basal end portion of the support shaft being fixed to the one of the pipe and the valve element and a tip end portion of the support shaft being free relative to the one of the pipe and the valve element, the support shaft functioning as a swing fulcrum for the valve element; and
a bearing portion disposed on another one of the pipe and the valve element, the bearing portion swingably supporting the support shaft, the bearing portion comprising:
a receiving hole into which the tip end portion of the support shaft is inserted; and
an engaging groove with which the basal end portion side of the support shaft is engaged,
wherein the basal portion side of the support shaft is supported by a pair of supporting pieces, and a portion of the bearing portion enters between the supporting pieces, the portion having the engaging groove.

16. A fuel check valve that is attachable to a fuel tank, comprising:
a pipe having a tip end portion formed as a fuel outflow port, and a basal end portion that communicates with a fuel supply pipe;
a valve element attached in an openable and closable manner to the fuel outflow port of the pipe, the valve element being normally urged by a spring in a closing direction;
a support shaft disposed on one of the pipe and the valve element, a basal end portion of the support shaft being fixed to the one of the pipe and the valve element and a tip end portion of the support shaft being free relative to the one of the pipe and the valve element, the support shaft functioning as a swing fulcrum for the valve element; and
a bearing portion disposed on another one of the pipe and the valve element, the bearing portion swingably supporting the support shaft, the bearing portion comprising:
a receiving hole into which the tip end portion of the support shaft is inserted; and
an engaging groove with which the basal end portion side of the support shaft is engaged,
wherein a cutaway portion that is obliquely cut away toward a tip end in an axial direction is formed in a part in a circumferential direction of the tip end portion of the support shaft.

17. The fuel check valve according to claim 16, wherein the support shaft includes an increased-diameter portion adjacent the tip end portion, a diameter of the increased-diameter portion being larger than an inner diameter of the receiving hole, and
wherein, in the increased-diameter portion of the support shaft, a further cutaway portion is disposed at a position that is opposed in a circumferential direction to the cutaway portion of the tip end portion.

18. A fuel check valve that is attachable to a fuel tank, comprising:
a pipe having a tip end portion formed as a fuel outflow port, and a basal end portion that communicates with a fuel supply pipe;
a valve element attached in an openable and closable manner to the fuel outflow port of the pipe, the valve element being normally urged by a spring in a closing direction;
a support shaft disposed on one of the pipe and the valve element, a basal end portion of the support shaft being fixed to the one of the pipe and the valve element and a tip end portion of the support shaft being free relative to the one of the pipe and the valve element, the support shaft functioning as a swing fulcrum for the valve element; and
a bearing portion disposed on another one of the pipe and the valve element, the bearing portion swingably supporting the support shaft, the bearing portion comprising:
a receiving hole into which the tip end portion of the support shaft is inserted; and
an engaging groove with which the basal end portion side of the support shaft is engaged, wherein the bearing portion is configured such that the tip end portion of the support shaft is configured to be inserted into the receiving hole without deforming the bearing portion.

19. A fuel check valve that is attachable to a fuel tank, comprising:

a pipe having a tip end portion formed as a fuel outflow port, and a basal end portion that communicates with a fuel supply pipe;

a valve element attached in an openable and closable manner to the fuel outflow port of the pipe, the valve element being normally urged by a spring in a closing direction;

a support shaft disposed on one of the pipe and the valve element, a basal end portion of the support shaft being fixed to the one of the pipe and the valve element and a tip end portion of the support shaft being free relative to the one of the pipe and the valve element, the support shaft functioning as a swing fulcrum for the valve element; and a bearing portion disposed on another one of the pipe and the valve element, the bearing portion swingably supporting the support shaft, the bearing portion comprising:

a receiving hole into which the tip end portion of the support shaft is inserted; and an engaging groove with which the basal end portion side of the support shaft is engaged, wherein the bearing portion is formed completely around the receiving hole.

* * * * *